United States Patent
Pittala

(10) Patent No.: US 10,828,706 B2
(45) Date of Patent: Nov. 10, 2020

(54) END MILL

(71) Applicant: SANDVIK INTELLECTUAL PROPERTY AB, Sandviken (SE)

(72) Inventor: Gaetano Pittala, Rovereto (IT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/073,128

(22) PCT Filed: Jan. 9, 2017

(86) PCT No.: PCT/EP2017/050329
§ 371 (c)(1),
(2) Date: Jul. 26, 2018

(87) PCT Pub. No.: WO2017/129387
PCT Pub. Date: Aug. 3, 2017

(65) Prior Publication Data
US 2019/0039153 A1     Feb. 7, 2019

(30) Foreign Application Priority Data

Jan. 27, 2016 (EP) .................................... 16152934

(51) Int. Cl.
*B23C 5/10* (2006.01)
(52) U.S. Cl.
CPC .......... *B23C 5/10* (2013.01); *B23C 2210/241* (2013.01); *B23C 2210/402* (2013.01)

(58) Field of Classification Search
CPC ................ B23C 5/10; B23C 2210/241; B23C 2210/402; B23C 2210/203; B23B 2251/241; B23B 2251/245
See application file for complete search history.

(56) References Cited

U.S. PATENT DOCUMENTS

| | | | | |
|---|---|---|---|---|
| 5,160,232 A | * | 11/1992 | Maier | B23B 51/02 407/54 |
| 5,486,075 A | * | 1/1996 | Nakamura | B23B 51/02 408/224 |
| 8,882,411 B2 | * | 11/2014 | Koike | B23B 51/02 408/227 |
| 2009/0317198 A1 | * | 12/2009 | Hanks | B23C 5/10 407/54 |

(Continued)

FOREIGN PATENT DOCUMENTS

| | | | |
|---|---|---|---|
| AT | 14275 U1 * | 7/2015 | ............... B23C 5/10 |
| DE | 102014108513 A1 | 12/2015 | |
| EP | 1478484 B1 | 10/2008 | |

(Continued)

*Primary Examiner* — Ryan C Rufo
(74) *Attorney, Agent, or Firm* — Corrine R. Gorski

(57) ABSTRACT

An end mill has a shank section and a cutting section connected thereto. The cutting section includes a core supporting at least two spaced apart teeth that have a cutting edge extending in the axial direction with respect to the axis of rotation of the end mill. Each cutting edge has a flute associated therewith and each flute has, for each cross-section of the end mill perpendicular to the axis of rotation thereof, a bottom point on the core at a shortest distance to the axis of rotation. At least two flutes have a shortest distance that varies differently with the distance to a cutting end of the end mill.

14 Claims, 2 Drawing Sheets

(56) References Cited

U.S. PATENT DOCUMENTS

2014/0294528 A1   10/2014   Azegami et al.
2017/0120349 A1*   5/2017   Haimer .................... B23C 5/10

FOREIGN PATENT DOCUMENTS

| | | | |
|---|---|---|---|
| JP | 2007136627 A | * | 6/2007 |
| JP | 2014210324 A | | 11/2014 |
| KR | 20130047962 A | | 5/2013 |
| WO | 9423875 A1 | | 10/1994 |

* cited by examiner

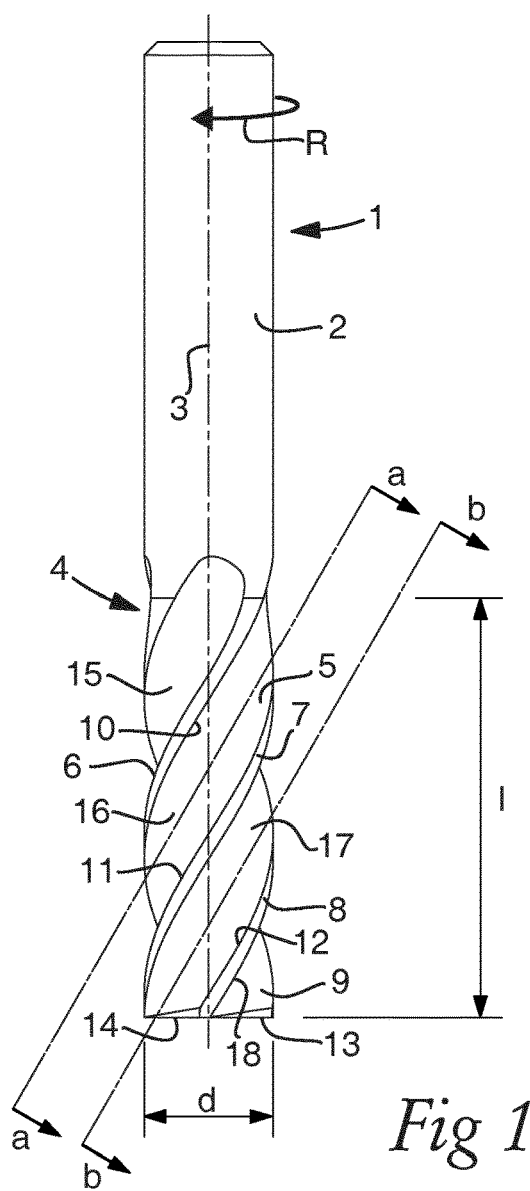
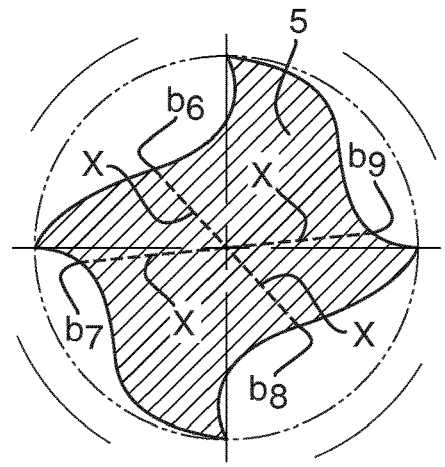
Fig 1
Fig 2
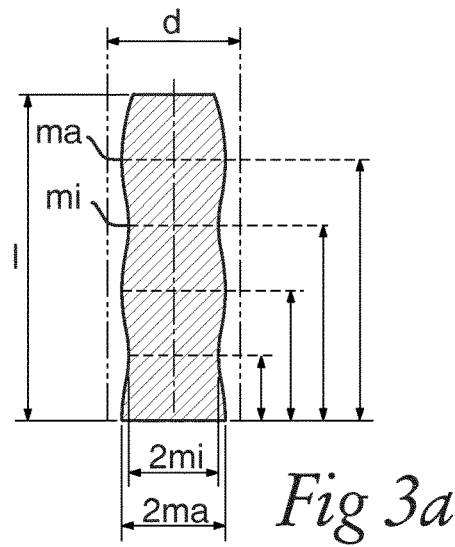
Fig 3a
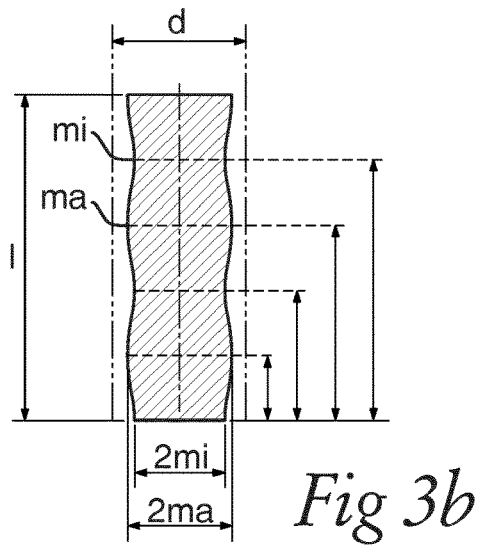
Fig 3b

END MILL

RELATED APPLICATION DATA

This application is a § 371 National Stage Application of PCT International Application No. PCT/EP2017/050329 filed Jan. 9, 2017 claiming priority to EP 16152934.2 filed Jan. 27, 2016.

TECHNICAL FIELD OF THE INVENTION

The present invention relates to an end mill.

Such an end mill has normally more than two teeth provided with cutting edges, such as four, and these teeth are normally but not necessarily helically twisted around the rotation axis of the end mill. The cutting section and the shank section to be retained in a rotary driven apparatus may be in one piece or the cutting section may be arranged on an exchangeable head removably connected to the shank section.

An end mill of this type may be used for different machining purposes by acting of the cutting edges of the cutting section upon a work piece, and the present invention is particularly directed to an end mill for roughing, i.e. for a high (fast) removal of a lot of material in the form of chips from a work piece. Such heavy machining creates stress on the end mill which may result in chatter or regenerative vibrations of especially the end mill tool. This chatter may in its turn generate noises causing environmental problems to a user of the end mill. Another result of the chatter is a degraded accuracy of the machining carried out by the end mill as well as a reduced tool life of the end mill.

BACKGROUND ART

EP 1 478 484 discloses an end mill of the type defined in the introduction for which the shortest distance to the axis of rotation of the end mill of each flute is reduced in the direction towards the cutting end of the end mill, i.e. the core diameter is tapered towards the tip of the end mill tool. This shape of the cutting section of the end mill has the aim to obtain a good resistance to bending moments applied to the end mill in machining operation. However, said problems with chatter will still be there would this end mill be used for roughing.

SUMMARY OF THE INVENTION

The object of the present invention is to provide an end mill of the type defined in the introduction addressing said problem of chattering described above.

This object is according to the invention obtained by providing such an end mill that has an axial portion of a cutting section of a predetermined length having at least two flutes each with a shortest distance to the axis of rotation that vary differently, one increasing while the other decreasing, with the distance to the cutting end of the end mill in the axial direction.

Due to that, for each said axial portion of the cutting section of a predetermined length, at least two flutes have the shortest distance of the bottom point to the axis of rotation varying differently, one increasing while the other decreasing, with the distance to the cutting end of the end mill in the axial direction a substantial reduction of chatter when using the end mill for roughing may be obtained. Thereby, for at least one cross-section of the end mill perpendicular to the axial rotation thereof in such an axial portion, the shortest distance of one of the at least two flutes is different than the shortest distance of the other one of the at least two flutes. Such core cross-sections are thus irregular.

Due to these inventive features, the stiffness of the end mill will be different in different directions of the end mill where the core cross-section is irregular, which results in an amplitude of vibration of the cutting section of the end mill varying during the cutting process, so that the chatter phenomenon is reduced by the fact that the different waves caused by different teeth of the end mill on the work piece surface machined may be broken or at least partially cancel each other out and a regenerative effect will be avoided. Thus, the waves will be phase shifted and by that acting to cancel each other out. Accordingly, a core cross-section varying in the axial direction of the cutting section by having at least two flutes with a said shortest distance varying differently with the distance to the cutting end of the end mill in the axial direction, whereby most core cross-section will be irregular, the generation of chatter during machining may be remarkably reduced. And a desired stiffness of the tool may still be maintained.

According to an embodiment of the invention, the cross-section area of the core is substantially constant or constant in a majority of or in all said axial portions of the cutting section. Substantially does here mean differing by less than 5%. Thus, the cross-section will have different shape in different axial positions, while the area of the cross-section will remain substantially the same for all axial positions. This means that a favourable chatter reduction may be combined with excellent strength of the tool.

According to an embodiment of the invention, said axial portion of a predetermined length is shorter than the dimension of any said shortest distance for a said bottom point or shorter than half said dimension. It has turned out to be preferred to have the features of the characterizing portion of claim 1 present in each axial portion of such a restricted length for obtaining a substantial reduction influence of chatter when carrying out milling, especially roughing, by the end mill.

According to an embodiment of the invention, the centre axis of the core corresponds to the axis of rotation of the end mill over the entire length of the cutting section. This makes the end mill stable and prolongs the life time thereof.

According to an embodiment of the invention, at least one flute has a said shortest distance varying with the distance to the cutting end over the entire longitudinal extension of the flute. This results in a cross-section of the core of the end mill varying continuously along the axial direction of the cutting section of the end mill, so that the stiffness varies not only at a given cross-section when rotating the end mill but also continuously in different axial portions along the rotation axis of the end mill. Thus, the stiffness of the tooth to which this flute belongs will by this vary along the longitudinal extension of the flute.

According to an embodiment of the invention, said shortest distance of at least one flute varies by comprising consecutive gradually decreasing and gradually increasing parts, which is a simple and efficient and by that favourable way of obtaining a variation of the shortest distance of the bottom point of the at least one flute to the axis of rotation of the end mill for obtaining efficient reduction of chatter in end milling operation of the end mill.

According to an embodiment of the invention constituting a further development of the embodiment last mentioned, said shortest distance of at least one flute varies periodically over the longitudinal extension of the flute, such as by describing a sinusoidal or a zigzag curve when plotted against the distance to the cutting end.

According to an embodiment of the invention, said shortest distance of at least one flute has a maximum exceeding a minimum thereof by at least 10%, 25-60%, 30-50% or 35-45%. It has turned out that a variation of said shortest distance of the at least one flute by at least 10% is necessary for obtaining an efficient reduction of chatter in high axial engagement in end milling operation, and the reduction is in some roughing operations especially efficient when the maximum of said shortest distance exceeds the minimum thereof by 30-50%. If the maximum of the shortest distance exceeds the minimum thereof by more than 60% the stability of the end mill may for some machining be insufficient.

According to an embodiment of the invention, one flute has minima and maxima of the shortest distance at different axial positions than minima and maxima of the shortest distance of another flute. Core cross-sections will be irregular.

According to an embodiment of the invention, the end mill has at least two flutes with said shortest distance varying periodically in the axial direction of the end mill and being phase shifted with respect to each other, in which it is preferred to have a phase shift of 180°, so that the shortest distance has a minima for one flute when it has a maxima for the other flute.

According to an embodiment of the invention, all flutes have a said shortest distance which is different at different distances to the cutting end over the longitudinal extension of the cutting section. "Different at different distances" is to be interpreted broadly and means that all flutes have variations of said shortest distance but this may still assume the same value at some distances such as when varying periodically.

According to an embodiment of the invention, said teeth with cutting edges are helically twisted around the rotation axis of the end mill resulting in a preferred behaviour of the end mill in end milling operation by making the cutting process smooth and evacuation of chips efficient.

According to an embodiment of the invention, the end mill has four teeth with a said cutting edge each, and according to a further development of this embodiment, every second flute with respect to the intended direction of rotation of the end mill has the same said shortest distance at each said core cross-section of the end mill over the longitudinal extension of the cutting section. This means that the stiffness of the end mill will have a suitable variation in different directions of the end mill and by that result in an efficient reduction of chatter.

According to another embodiment of the invention the cutting section of the end mill is arranged on an exchangeable head which is configured to be removeably connected to the shank section.

Further advantageous features as well as advantages of the present invention appear from the description following below.

BRIEF DESCRIPTION OF THE DRAWINGS

With reference to the appended drawings, below follows a specific description of embodiments of the invention cited as examples.

In the drawings:

FIG. 1 is a view of and end mill according to a first embodiment of the invention, FIG. 2 is a cross-section view of the end mill in FIG. 1 perpendicular to the axis of rotation thereof, FIGS. 3a and 3b are cross-section views along the lines a-a and b-b in FIG. 1 of the core of the cutting section of the end mill showing the core dimension for the teeth 6, 8 and the teeth 7, 9, respectively.

DETAILED DESCRIPTION OF EMBODIMENTS OF THE INVENTION

Figure 4:
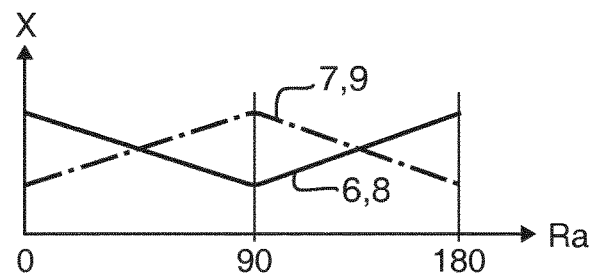
FIG. 4 is a graph showing the core dimension versus rotation angle of the end mill for flutes belonging to two adjacent teeth of the end mill according to FIG. 1, FIGS. 5 and 6 are simplified views illustrating up-milling carried out by an end mill according to the invention.

An end mill 1 according to an embodiment of the invention is shown in FIG. 1. This end mill 1 has a shank section 2 to be retained in a rotary driven apparatus for rotating the end mill around an axis of rotation 3 for carrying out milling machining of a work piece.

A cutting section 4 is connected to the shank section 2, and this cutting section comprises a core 5 which supports four spaced apart teeth 6-9 which each have a cutting edge 10-13. The teeth and by that the cutting edges are helically twisted around the rotation axis 3 of the end mill and extend from the connection of the cutting section to the shank section to a cutting end 14 of the end mill. The extension axial I of the cutting section is in this embodiment 25 mm, whereas the diameter d of the circular cylinder generated or defined by the rotation of the cutting edges is 10 mm. The end mill is made in one piece of cemented carbide by pressing a powder mixture and then carrying out sintering.

Each cutting edge has a flute 15-18 associated therewith and this flute is located before the cutting edge in an intended direction of rotation R of the end mill. Each flute has for each cross-section of the end mill perpendicular to the axis of rotation thereof a bottom point $b_6$-$b_9$ for the teeth 6-9 on the core 5 at a shortest distance x to the axis of rotation 3 as shown in FIG. 2.

Every second flute, accordingly the flutes belonging to the teeth 6 and 8 and those belonging to the teeth 7 and 9, with respect to the intended direction of rotation of the end mill has the same said shortest distance x at each cross-section of the end mill over the longitudinal extension of the cutting section. However, for each axial portion of the cutting section of a predetermined length, which here is infinitely short, the flutes of all the teeth 6-9 have a said shortest distance x differing with the distance to the cutting end 14 of the end mill in the axial direction, and each said axial portion of a predetermined length, which here accordingly is infinitely short, comprises a cross-section of the end mill perpendicular to the axial rotation thereof for which said shortest distance x of the flutes belonging to the teeth 6 and 8 is different than the shortest distance x of the flutes belonging to the teeth 7 and 9 so that this core cross-section is irregular. This irregularity is shown for one such cross-section in FIG. 2.

FIGS. 3a and 3b show how the shortest distance x varies along the longitudinal extension in the direction the rotation axis 3 of the cutting section 4 of the end mill for the flutes belonging to the teeth 6 and 8 (FIG. 3a) and 7 and 9 (FIG. 3b). It is apparent that said shortest distance varies for each flute periodically according to a zigzag curve in the direction of the axis of rotation 3 and that the flutes of the teeth 6 and 8 are phase shifted with respect to the flutes of the teeth 7 and 9 by 180°, so that the shortest distance x has a minima mi for the flutes belonging to the teeth 6 and 8 at a cross-section where the flutes belonging to the teeth 7 and 9 have a maxima ma and conversely. Accordingly, there will be cross-sections where said shortest distance x will be the same for all the four flutes in a position about half way between a maxima and a minima. Or in other words, in a position where the shortest distance for two of the flutes increases in the axial direction of the end mill and the shortest distance decreases for the other two flutes and these shortest distances "meet". However, this will only be the case in a few axial positions along the axis of rotation of the end mill, so that each axial portion of the cutting section of a predetermined length will always have a cross-section for which the shortest distance of two of the flutes differs from that of the other two flutes irrespectively of how short said axial portion is.

The shortest distance at the minima mi is in this embodiment 2.5 mm and at the maxima ma 3.5 mm, which accordingly exceeds the shortest distance of the minima by 40%. The axial distance between each minimum and the consecutive maximum of one flute is 5 mm and accordingly the period of the variation of the shortest distance 10 mm.

FIG. 4 illustrates how the core dimension in the form of said shortest distance x of the flutes of the teeth 6, 8 (solid line) and the teeth 7, 9 (dashed line) is measured while following a flute half the way around the rotation axis of the end mill and accordingly varies with the rotation angle $R_a$ of the end mill showing that a full rotation of the end mill will cover two periods of the variation of the shortest distance x of each flute.

Figure 5:
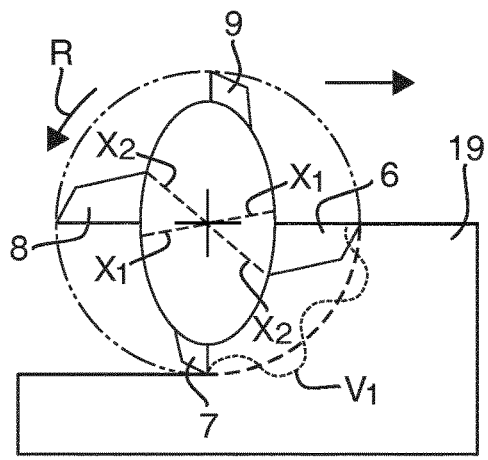
Figure 6:
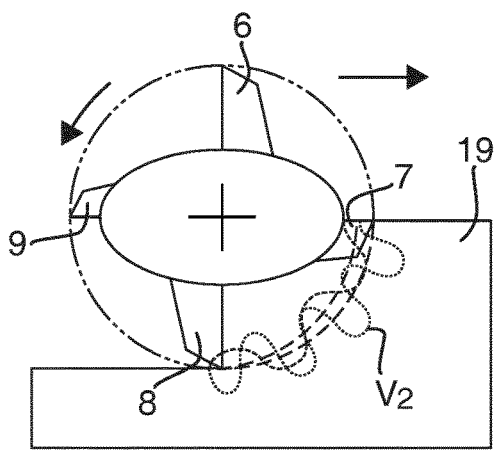

How the design of the cutting section of an end mill according to the embodiment of the invention just described with the combination of an irregular cross-section and a variation of said cross-section in the direction of the axis of rotation of the end mill will influence the generation of chatter during operation of the end mill will now be explained while making reference to FIGS. 5 and 6 showing up-milling carried out by such an end mill. These figures are simplified and only used for the purpose of explaining the invention. The core 5 is shown at a cross-section where the shortest distance $x_1$ associated with the flutes of the teeth 6 and 8 is shorter than the shortest distance $x_2$ of the flutes associated with the teeth 7 and 9. This means that the stiffness of the teeth 6 and 8 will be different from that of the teeth 7 and 9, so that the amplitude of the vibration on the surface of the work piece 19 will be different. The vibration wave $v_1$ on the work piece surface due to the tooth 6 is illustrated in FIG. 5 and the vibration wave $v_2$ on the work piece surface due to the tooth 7 is illustrated in FIG. 6. The reduction of chatter will be remarkable with respect to a standard cylindrical core being symmetric, for which the vibration waves caused by the milling action will have the same amplitude without any phase shift and a substantial chatter in the case of roughing. This remarkable reduction of chatter is due to, on one hand, that the amplitude is different so the generative effect is avoided and, on the other hand, due to that the vibration waves are phase shifted. The change of the core cross-section in the direction of the axis of rotation 3 of the end mill will further suppress the vibration at the tool and chatter.

Machining tests have been carried out for an end mill according to FIGS. 1 and 3a, 3b, and an end mill the minima shown in FIG. 3a, 3b at 2.5 mm and the maxima at 3 mm, i.e. exceeding the minima by 20%, and an end mill with a standard cylindrical core. It turned out that the reduction of chatter is most efficient for the end mill having the maxima of the shortest distance exceeding the minima by 40%, but that a substantial reduction of chatter with respect to an end mill with a standard cylindrical core is obtained already with a maxima of the shortest distance exceeding the minima thereof by 20%. However, to have the maxima of the shortest distance exceeding the minima thereof by more than 60% may reduce the positive influence of the varying core diameter upon the generation of chatter.

Figure 7:
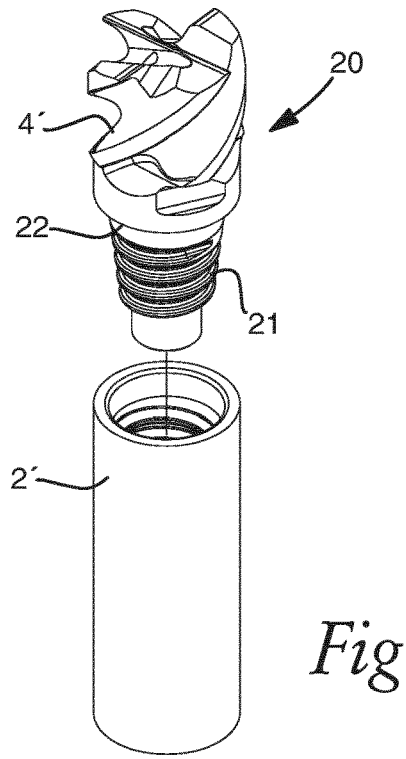
FIG. 7 is a perspective view showing an end mill according to a second embodiment of the invention.

FIG. 7 illustrates an end mill according to a second embodiment of the invention, which differs from that shown in FIG. 1 by the fact that the cutting section 4' is arranged on an exchangeable head 20 which is configured to be removably connected to the shank section 2' by a screw connection illustrated by outer threads 21 of a connection section 22 of the head 20.

The invention is of course not restricted to the embodiments thereof described above, but many possibilities to modifications thereof would be apparent to a person with skill in the art without departing from the scope of the invention as defined in the appended claims.

It is possible that not all or even only two of the flutes associated with the teeth of the cutting section of the end mill have a said shortest distance varying and that the other flutes have a shortest distance being constant along the longitudinal extension of the flutes. The predetermined length of said axial portion of the cutting section may have such a value that said shortest distance will be constant for all flutes over minor parts of the axial extension of the cutting section, for instance over 1 mm in the case of a said shortest distance of 3 mm.

The shortest distance of different flutes may vary differently periodically over the longitudinal extension of the flutes, so that for instance the shortest distance of one flute will describe a zigzag curve and for another a sinusoidal curve.

The number of teeth of the end mill may be any suitable for the intended use thereof, for example 5 or 6 or any other.

The diameter of the circular cylinder generated by rotation of the cutting edges may be any conceivable of an end mill depending upon the use intended therefor.

The invention claimed is:

1. An end mill comprising:
a shank section arranged to be retained in a rotary driven apparatus; and
a cutting section connected to the shank section, the cutting section including a plurality of axial portions along its longitudinal extension, each of the plurality of axial portions having a predetermined length in an axial direction with respect to an axis of rotation of the end mill, and a core having a plurality of teeth spaced from each other along the core, each of the plurality of spaced teeth having a cutting edge extending in the axial direction to a cutting end of the end mill located opposite to a cutting section end closest to a connection to the shank section, each cutting edge having a flute associated therewith, each flute being located before the respective cutting edge in an intended direction of rotation of the end mill and each flute having for each cross-section of the end mill perpendicular to the axis of rotation thereof a bottom point on said core at a shortest distance to the axis of rotation, wherein for each of the plurality of axial portions of the cutting section, respective flutes of at least two of the plurality of spaced teeth have respective shortest distances that vary differently along the longitudinal extension in the axial direction towards the cutting end of the end mill, one increasing while the other is decreasing, wherein a center axis of the core corresponds to the axis of rotation of the end mill over an entire length of the cutting section, and wherein said shortest distance of at least one of the flutes varies by having consecutive gradually decreasing and gradually increasing parts, wherein the cross-section area of the core is substantially constant or constant in a majority of or in all said plurality of axial portions of the cutting section.

2. The end mill according to claim 1, wherein the predetermined length of each said axial portion is shorter than any said shortest distance for said bottom point.

3. The end mill according to claim 1, wherein said shortest distance of at least one of the respective flutes varies periodically over the longitudinal extension.

4. The end mill according to claim 1, wherein said shortest distance of at least one of the respective flutes has a maximum exceeding a minimum shortest distance thereof by at least 10%.

5. The end mill according to claim 1, wherein one flute of the respective flutes has a minima and a maxima of said shortest distance at different axial positions than the minima and maxima of the shortest distance of another one of the respective flutes.

6. The end mill according to claim 1, wherein the respective flutes with said shortest distance varying periodically in the axial direction of the end mill are phase shifted with respect to each other.

7. The end mill according to claim 1, wherein the shortest distance of all the flutes is different at different distances from the cutting end over the longitudinal extension of the cutting section.

8. The end mill according to claim 1, wherein the plurality of spaced teeth with the cutting edges are helically twisted around the rotation axis of the end mill.

9. The end mill according to claim 1, wherein the plurality of spaced teeth of the cutting section are four teeth.

10. The end mill according to claim 9, wherein every second flute of the flutes of the spaced four teeth, with respect to the intended direction of rotation of the end mill, has the same shortest distance at each core cross-section of the end mill over the longitudinal extension of the cutting section.

11. The end mill according to claim 1, wherein the cutting section is arranged on an exchangeable head which is configured to be removably connected to the shank section.

12. The end mill according to claim 1, wherein said shortest distance of at least one of the respective flutes has a maximum exceeding a minimum thereof by 25-60%.

13. The end mill according to claim 1, wherein said shortest distance of at least one of the respective flutes has a maximum exceeding a minimum thereof by 30-50%.

14. The end mill according to claim 1, wherein said shortest distance of at least one of the respective flutes has a maximum exceeding a minimum thereof by 35-45%.

* * * * *